(12) United States Patent
Allidieres

(10) Patent No.: US 8,978,715 B2
(45) Date of Patent: Mar. 17, 2015

(54) METHOD FOR FILLING A TANK WITH PRESSURIZED GAS

(75) Inventor: Laurent Allidieres, Saint Martin d'Uriage (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 1385 days.

(21) Appl. No.: 12/670,254

(22) PCT Filed: Apr. 17, 2008

(86) PCT No.: PCT/FR2008/050682
§ 371 (c)(1),
(2), (4) Date: Jan. 22, 2010

(87) PCT Pub. No.: WO2009/013415
PCT Pub. Date: Jan. 29, 2009

(65) Prior Publication Data
US 2010/0193070 A1    Aug. 5, 2010

(30) Foreign Application Priority Data
Jul. 23, 2007    (FR) ...................................... 07 56669

(51) Int. Cl.
*F17C 5/06*    (2006.01)
(52) U.S. Cl.
CPC .................. *F17C 5/06* (2013.01); *Y02E 60/324* (2013.01); *Y02E 60/321* (2013.01)
USPC .................................. 141/1; 141/94; 141/104
(58) Field of Classification Search
USPC .......................................... 141/1, 94, 95, 104
See application file for complete search history.

(56) References Cited

U.S. PATENT DOCUMENTS

| 3,719,196 A | 3/1973 | McJones |
| 4,646,940 A * | 3/1987 | Kramer et al. ..................... 222/1 |

(Continued)

FOREIGN PATENT DOCUMENTS

| DE | 196 50 999 | 6/1998 |
| DE | 10 2005 039202 | 2/2007 |

(Continued)

OTHER PUBLICATIONS

International Search Report for PCT/FR2008/050682.

(Continued)

*Primary Examiner* — Nicolas A Arnett
(74) *Attorney, Agent, or Firm* — Christopher J. Cronin

(57) ABSTRACT

The invention relates to a method for filling a tank with pressurized gas, particularly hydrogen in the tank of a vehicle, using a filling station that comprises: a plurality of buffer containers for containing the pressurized gas and filling the tank through successive pressure balancing phases; a device for generating a pressurized gas and for filling said buffer containers from a fluid source; wherein the method comprises a tank filling step by gas transfer from a buffer container and simultaneously by gas transfer directly from the source via the gas generation device, characterized in that the pressurized-gas generation device includes a compressor connected to the buffer containers and in that the compressor supplies gas to the tank from a gas source including a first buffer container for at least part of a pressure balancing phase between at least one second buffer container and a tank, the buffer containers being successively used as sources by the compressor after being used for pressure balancing with the tank.

8 Claims, 2 Drawing Sheets

(56) References Cited

U.S. PATENT DOCUMENTS

| | | | |
|---|---|---|---|
| 5,207,530 A | 5/1993 | Brooks et al. | |
| 5,406,988 A | 4/1995 | Hopkins | |
| 6,152,191 A | 11/2000 | Chan et al. | |
| 6,792,981 B1 | 9/2004 | Manning et al. | |
| 7,316,859 B2 * | 1/2008 | Christie et al. | 429/430 |
| 8,069,885 B2 * | 12/2011 | Kederer et al. | 141/104 |
| 8,091,593 B2 * | 1/2012 | Allidieres | 141/82 |
| 8,122,918 B2 * | 2/2012 | Handa | 141/95 |
| 8,156,970 B2 * | 4/2012 | Farese et al. | 141/94 |
| 8,286,675 B2 * | 10/2012 | Farese et al. | 141/94 |
| 8,291,944 B2 * | 10/2012 | Allidieres | 141/60 |
| 8,360,112 B2 * | 1/2013 | Allidieres | 141/4 |
| 2005/0103400 A1 * | 5/2005 | Eichelberger et al. | 141/231 |
| 2008/0216913 A1 | 9/2008 | Kederer et al. | |
| 2009/0151812 A1 | 6/2009 | Allidieres | |
| 2009/0229701 A1 * | 9/2009 | Allidieres et al. | 141/2 |

FOREIGN PATENT DOCUMENTS

| | | |
|---|---|---|
| EP | 0 995 943 | 4/2000 |
| FR | 2 891 347 | 3/2007 |
| JP | 2003-172497 | 6/2003 |
| WO | WO 03060374 | 7/2003 |
| WO | WO 2007 019 948 | 2/2007 |
| WO | WO 2007 036 651 | 4/2007 |

OTHER PUBLICATIONS

Notice of Opposition to a European Patent and letter, Patent No. EP2174057, Grant date Mar. 16, 2011, "Method for Filling a Tank with Pressurised Gas," Proprietor of the Patent: L'Air Liquide Societe Anonyme pour l"Etude et l"Exploitation des Procedes Georges Claude, Opponent: Air Products and Chemicals, Inc., date filed: Dec. 16, 2011, 14 pages.

* cited by examiner

METHOD FOR FILLING A TANK WITH PRESSURIZED GAS

CROSS-REFERENCE TO RELATED APPLICATIONS

This application is a §371 of International PCT Application PCT/FR2008/050682, filed Apr. 17, 2008.

BACKGROUND

The present invention relates to a method for filling a tank with pressurized gas.

The invention relates more particularly to a method for filling a tank with pressurized gas, particularly hydrogen in the tank of a vehicle, using a filling station that comprises a plurality of buffer containers for containing the pressurized gas and filling the tank through successive pressure balancing phases and a device for generating a pressurized gas and for filling said buffer containers from a fluid source.

The rapid filling (typically in less than 15 minutes) of tanks under high pressure (above 700 bar in particular) mounted on vehicles (for example hydrogen gas for vehicles equipped with fuel cells) is conventionally carried out by successive pressure balancings with a plurality of buffer containers at high pressure. This "cascade" filling is conventionally obtained by providing a succession of pressure balancings between, on the one hand, the target tank to be filled and, on the other hand, buffer containers under increasing pressure (for example 200 bar then 300 bar then 450 bar then 850 bar).

This well known method is described abundantly in the literature, particularly for natural gas or hydrogen applications.

This known method for filling by pressure balancings nevertheless requires a large number of high pressure containers. This accordingly increases the risks of leakage and the quantity of gas which must be stored on a site. Typically, the quantity of gas immobilized by this method is about three times the average daily consumption used by the station. This may require the filing of applications for special permits in the case in which the gas is inflammable or hazardous.

Furthermore, by this method, for successive fillings of several vehicles without excessive waiting time, it is necessary to increase the number of high pressure buffer containers available and therefore necessarily the size of the filling station.

According to another known filling technology called "slow filling" (for example longer than 15 minutes), the gas is introduced into the tank directly from a low pressure hydrogen source via a compressor.

This "direct compression" filling method does not in fact permit the filling of tanks in less than 15 minutes unless very large compressors (or cryogenic pumps) are used, requiring very high electric power (for example about 70 kW for a liquid pump and more than 300 kW for a compressor).

SUMMARY OF THE INVENTION

It is an object of the present invention to overcome all or part of the drawbacks of the prior art described above.

For this purpose, the inventive method, which also conforms to the generic definition given in the above introduction, is essentially characterized in that it comprises a step of filling the tank by gas transfer from a buffer container and, simultaneously, by gas transfer directly from the source via the gas generation device.

Furthermore, embodiments of the invention may comprise one or more of the following features:
- the pressurized gas generation device directly feeds the tank with gas at least during part of a pressure balancing phase between at least one buffer container and the tank,
- the pressurized gas generation device and the buffer containers are connected in parallel to a common feed line for connecting to the tank,
- the pressurized gas generation device comprises a compressor and in that the source is connected to the pressurized gas generation device and comprises at least one from: a mobile pressurized gas container, a system for synthesizing or producing said gas, a network for distributing said gas, at least one of the buffer containers,
- the pressurized gas generation device includes a compressor connected to the buffer containers and in that the compressor supplies gas to the tank from a gas source including a first buffer container (2) for at least part of a pressure balancing phase between at least one second buffer container (3) and a tank,
- the first container or buffer used as a source by the compressor is different from the second buffer container during pressure balancing,
- the container or buffers are used successively as sources by the compressor after being used for pressure balancing with the tank,
- at least part of the buffer containers are connected to the suction inlet of the compressor via a line comprising at least one shutoff valve,
- the pressurized gas generation device comprises a cryogenic circuit comprising a pump and a vaporization/pressurization system and in that the source is connected to the gas generation device and comprises a tank of liquefied gas at low temperature.

For a further understanding of the nature and objects for the present invention, reference should be made to the detailed description, taken in conjunction with the accompanying drawing, in which like elements are given the same or analogous reference numbers.

BRIEF DESCRIPTION OF THE FIGURES

Other features and advantages will appear from a reading of the description below, in conjunction with the figures in which.

DETAILED DESCRIPTION OF THE INVENTION

Figure 1:
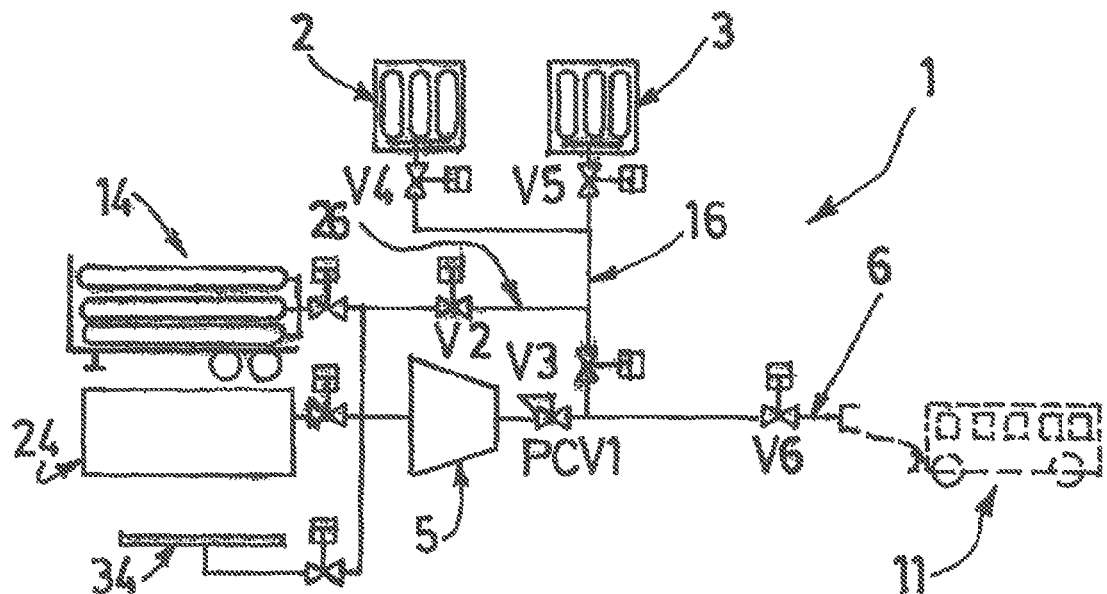
FIG. 1 shows, in a single schematic, the structure and operation of several alternative embodiments of a filling system according to the invention.

The filling system station 1 shown in FIG. 1 conventionally comprises two buffer containers 2, 3 of gas (or "buffer tanks") connected in parallel to a feed line 6 for connecting to the inlet of a tank 11 to be filled. For the sake of simplification, the tank 11 to be filled is symbolized by a vehicle. Each buffer container 2, 3 is connected to the feed line 6 via a respective valve V4, V5 and a common line 16 also comprising a valve V3.

The station 1 also comprises at least one compressor 5 located on the filling line 6. The inlet of the compressor 5 is fluidly connected to at least one gas source 14, 24, 34. The outlet of the compressor 5 is fluidly connected to the filling line 6 via, for example, a pressure controller PCV1 (pressure and/or flow control valve). Conventionally, the compressor 5 is designed to ensure the filling of the buffer containers 2, 3 with a gas at a lower pressure supplied by a source 14, 24, 34. In the example in FIG. 1, three sources 14, 24 34 are connected in parallel to the inlet of the compressor 5 via respective valves (a mobile pressurized gas container such as a cylinder semi-trailer or rack of high pressure gas cylinders, a system 24 for synthesizing or producing said gas, a network 34 for distributing said gas).

Figure 2:
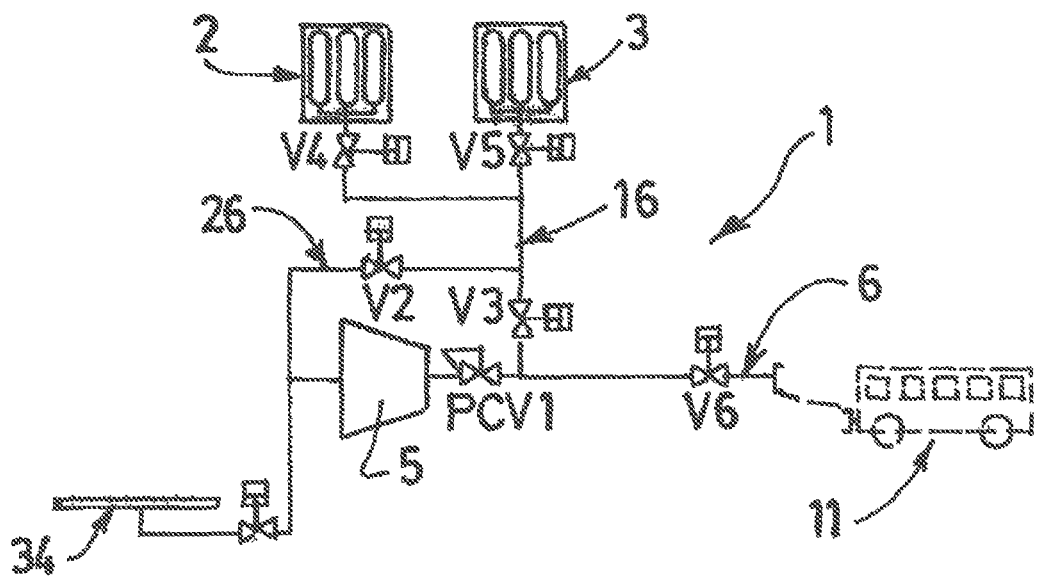
FIG. 2 shows a schematic view illustrating the structure and operation of an alternative embodiment of the filling system of FIG. 1.

Obviously, and as shown in FIG. 2, a single gas source is generally necessary (for example a network 34 if available symbolized by a pipeline).

The gas source or sources 14, 24, 34 may also be connected directly to the feed line 6 via a line 26 comprising a valve V2 (directly means without passing through the compressor 5). For example, the source line 26 is connected to the common line 16 of the buffer containers 2, 3 upstream of the valve V3. This source line 26, if necessary, serves to provide a first pressure balancing between, on the one hand, the source 34 and, on the other hand, a buffer container 2, 3 or the tank 11.

Thus the compressor 5 is provided to load the buffer containers 2, 3 at different storage pressures. When the buffer containers 2, 3 are filled, a tank 11 can be filled by the known method of successive pressure balancings (the buffer containers 2, 3 are used after one another in an order of increasing storage pressure). After one or more fillings, the buffer containers 2, 3 can again be filled by the above method. Conventionally, it is also possible to fill a buffer container 2, 3 while another buffer container 2, 3 is used to fill the tank 11.

According to an advantageous feature of the invention, the station 1 simultaneously carries out the transfer of gas from a buffer container 2, 3 to the tank 11, a gas transfer directly from the source 34 via the compressor 5 (directly means that the gas does not pass through a buffer container). During a pressure balancing phase, the feed line 6 therefore simultaneously receives gas supplied by the compressor 5 and gas supplied by a buffer container 2,3.

The invention thus allows a particularly rapid filling via a compressor 5 with a simultaneous additional gas input from high pressure containers 2, 3.

The invention thereby serves to perform a rapid filling with a compressor 5 having a relatively smaller size and power than a compression machine designed to fill the tank 11 directly by itself. The invention also serves to decrease the size of the storage capacities of the buffer containers 2, 3. The station 1 according to the invention also allows fillings called "partial" according to the prior art, that is without simultaneously operating the compressor 5 as auxiliary supply (particularly in case of maintenance or breakdown thereof).

In an example of operation described with reference to FIG. 2, the tank 11 can be filled as follows. In a first phase, the station 1 is controlled to carry out the first pressure balancing between a first buffer container 2 (the buffer container having the lowest pressure but higher than that of the tank 11) and the tank 11. In order to increase the quantity of gas transferred, the compressor 5 is operated during this balancing phase and simultaneously feeds the filling line 6.

In a second phase, the station 1 controls a second pressure balancing between the tank 11 and a second buffer container 3. The compressor 5 is also activated during the second step to participate simultaneously in the filling.

In the examples described above and below, only two buffer containers 2, 3 have been shown. Obviously, the invention is not limited to this configuration and may, for example, comprise more than two buffer containers 2, 3.

Figure 3:
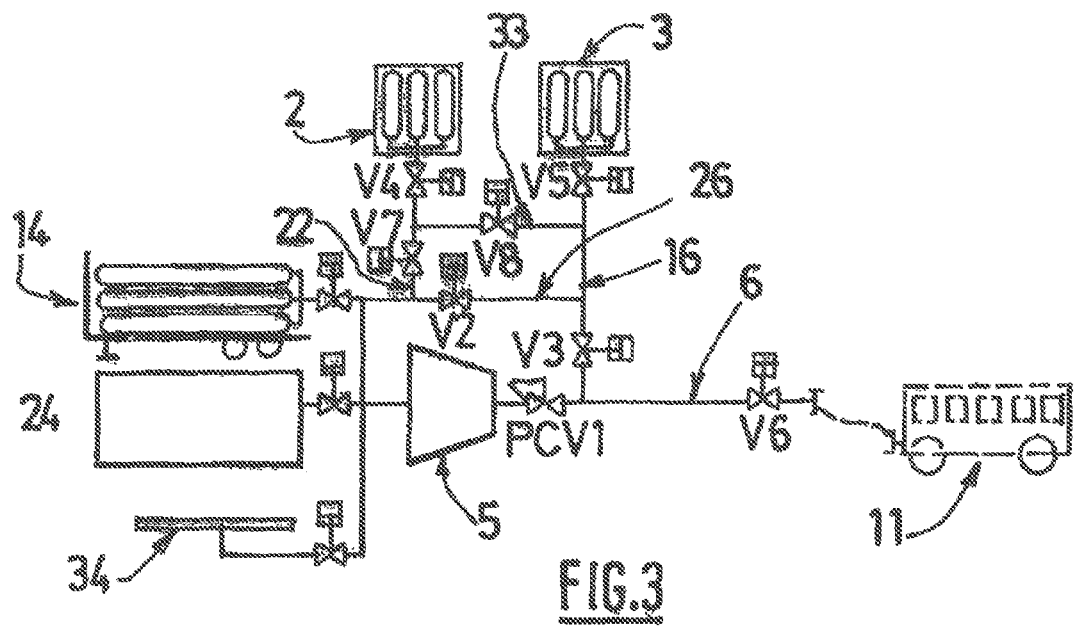
FIG. 3 shows a schematic view illustrating the structure and operation of a second embodiment of the filling system according to the invention.

FIG. 3 shows an example of a second embodiment of the invention in which, simultaneously with a pressure balancing between a buffer container 3 and the tank 11, the compressor 5 supplies make-up gas from another buffer container 2 (and no longer from one of the "conventional" sources 14, 24, 34 above).

For example, the compressor 5 carries out the simultaneous gas make-up by withdrawing gas from "the second last high pressure buffer container" 2 (the one that already served during a pressure balancing with the tank 11). Obviously, for greater efficiency, this buffer container 2 is preferably used as a gas source of the compressor 5 only if it contains gas at a pressure that is even higher than the pressure of the "conventional" source 34. According to this method of providing a make-up of filling gas by the compressor which is increased in comparison with the known solutions because the suction pressure of the gas entering the compressor is relatively higher and is adapted in real time to the various balancing phases and to the available pressures. Moreover, this increases the delivery of the compressor.

In this embodiment, the station 1 may provide at least one line 22, 33 fluidly connecting at least one buffer container 2, 3 with the inlet of the compressor 5. These lines 22, 33 preferably comprise respective valves V7, V8 (cf. FIG. 3).

Figure 4:
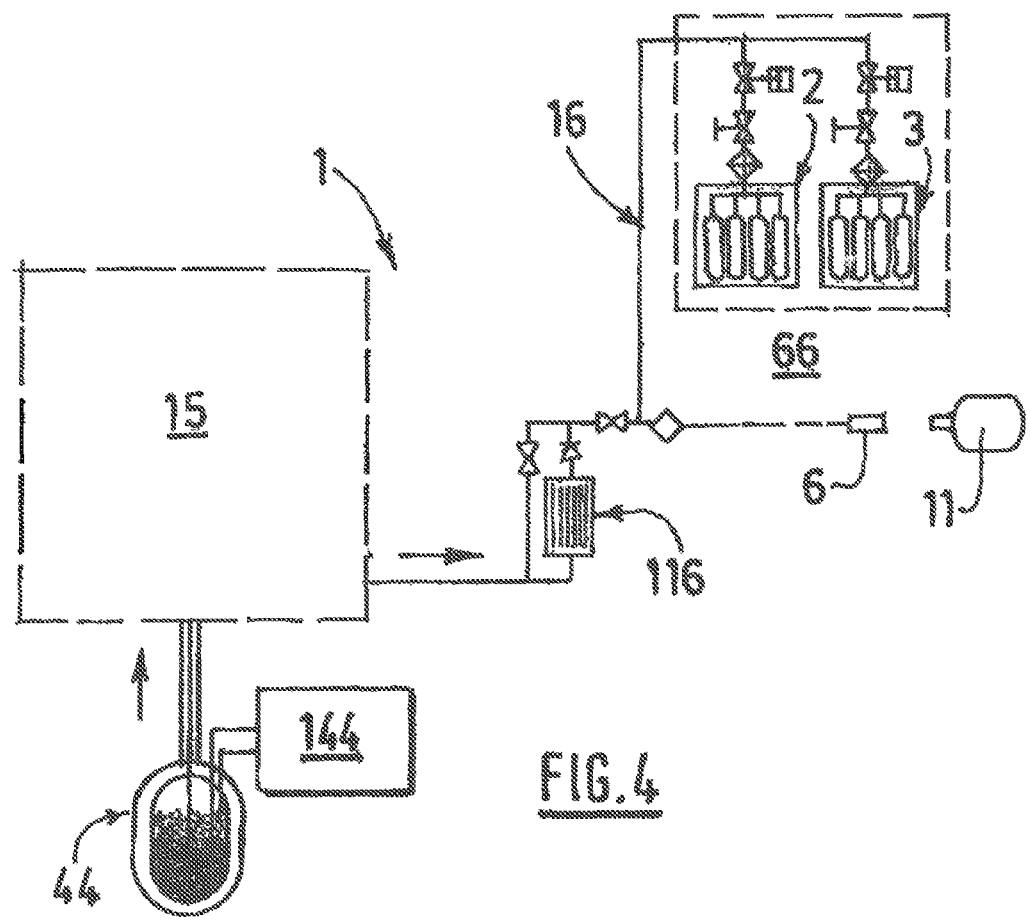
FIG. 4 shows a schematic and partial view illustrating the structure and operation of a third embodiment of the filling system according to the invention.

FIG. 4 shows a third exemplary embodiment of the invention in which the low pressure gas source or sources and the compressor 5 are replaced by a liquefied gas storage tank 44 associated with a system pumping 15 and vaporizing 116 liquefied gas.

The cryogenic liquid is withdrawn from the storage tank 44 in a circuit 15 known per se and not shown in detail for the sake of brevity. The cryogenic liquid is then vaporized (heat exchanger 116) upstream of the feed line 6.

As previously, two buffer containers 2, 3 are connected 16 to the feed line 6. For the sake of simplification, the circuits and control devices of this liquid storage unit 44 are symbolized by a block 144. Similarly, the known control components (valves, sensors, filters, safety organs, etc.) have not been shown for the sake of simplification on the feed line 6.

It can therefore be easily understood that, while having a simple and inexpensive structure, the invention serves both to increase the flow rate of gas transferred during a filling, to shorten the filling time, and to decrease the daily capacity of filling gas immobilized in the station. The invention serves in particular to improve the operation of already existing stations.

It will be understood that many additional changes in the details, materials, steps and arrangements of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a tank with pressurized gas at a filling station, the filling station having (a) a plurality of buffer containers containing pressurized gas and (b) a pressurized gas generation device for generating a pressurized gas from a fluid source, the pressurized gas generation device including a compressor connected to the plurality of buffer containers, the method comprising the step of:

simultaneously filling the tank by gas transfer from a buffer container and by gas transfer directly from the fluid source via the pressurized gas generation device, wherein the compressor supplies pressurized gas to the tank from the fluid source including a first buffer container during at least part of a pressure balancing phase between at least one second buffer container and the tank, each of the plurality of buffer containers being successively used as the fluid source by the compressor after being used for pressure balancing with the tank.

2. The method of claim 1, wherein the pressurized gas is hydrogen and the tank is the tank of a vehicle.

3. The method of claim 1, wherein the pressurized gas generation device directly feeds the tank with pressurized gas at least during part of a pressure balancing phase between at least one buffer container and the tank.

4. The method of claim 1, wherein the pressurized gas generation device and the plurality of buffer containers are connected in parallel to a common feed line for connecting to the tank.

5. The method of claim 1, wherein the fluid source is selected from the group consisting of a mobile pressurized gas container, a system for synthesizing or producing the pressurized gas, a network for distributing the pressurized gas, and at least one of the plurality of buffer containers.

6. The method of claim 1, wherein the first buffer container used as the fluid source by the compressor is different from the second buffer container during pressure balancing.

7. The method of claim 1, wherein at least part of the plurality of buffer containers are connected to a suction inlet of the compressor via a line comprising at least one shutoff valve.

8. The method of claim 1, wherein the pressurized gas generation device including a cryogenic circuit having a pump and a vaporization/pressurization system and the fluid source comprises a tank of liquefied gas at low temperature.

* * * * *